(12) United States Patent
Misikangas et al.

(10) Patent No.: US 7,299,059 B2
(45) Date of Patent: Nov. 20, 2007

(54) POSITIONING TECHNIQUE

(75) Inventors: Pauli Misikangas, Helsinki (FI); Lare Lekman, Helsinki (FI)

(73) Assignee: Ekahau Oy, Helsinki (FI)

( * ) Notice: Subject to any disclaimer, the term of this patent is extended or adjusted under 35 U.S.C. 154(b) by 371 days.

(21) Appl. No.: 11/030,334

(22) Filed: Jan. 7, 2005

(65) Prior Publication Data
US 2005/0197139 A1 Sep. 8, 2005

Related U.S. Application Data

(63) Continuation of application No. PCT/FI03/00553, filed on Jul. 8, 2003.

(30) Foreign Application Priority Data

Jul. 10, 2002 (FI) .................................. 20021357

(51) Int. Cl.
*H04Q 7/20* (2006.01)
*H04B 17/00* (2006.01)

(52) U.S. Cl. ................ 455/457; 455/456.1; 455/456.5; 455/67.11; 455/67.7

(58) Field of Classification Search ............ 455/456.1, 455/456.2, 456.5, 456.6, 67.11, 517, 457, 455/67.7
See application file for complete search history.

(56) References Cited

U.S. PATENT DOCUMENTS 5,781,150 A 7/1998 Norris
6,263,208 B1 * 7/2001 Chang et al. ............ 455/456.3
6,269,246 B1 7/2001 Rao et al.
6,275,186 B1 8/2001 Kong
6,393,294 B1 5/2002 Perez-Breva et al.
6,397,073 B1 5/2002 Hottinen
6,477,380 B1 * 11/2002 Uehara et al. ........... 455/456.1
6,782,265 B2 8/2004 Perez-Breva et al.
2003/0064735 A1 * 4/2003 Spain et al. ................. 455/456

FOREIGN PATENT DOCUMENTS

| EP | 1 022 578 A2 | 7/2000 |
|---|---|---|
| JP | H10-051840 A | 2/1998 |
| WO | WO 01/33825 A1 | 5/2001 |
| WO | WO 01/58195 A1 | 8/2001 |

OTHER PUBLICATIONS

Millymaki et al, "A Probabilistic Approach to WLAN User Location Estimation", The Third IEEE Workshop on Wireless local Area Networks, Sep. 2001.

(Continued)

*Primary Examiner*—George Eng
*Assistant Examiner*—Un C. Cho
(74) *Attorney, Agent, or Firm*—Barnes & Thornburg LLP

(57) ABSTRACT

A target device's location in a radio network is estimated by maintaining a probabilistic model for several sample points that indicate expected distributions of signal values at a given location. The target device observes signal values, wherein the sequence of observations and the respective locations constitute a Hidden Markov Model. A graph models the topology of the positioning environment. The graph indicates several nodes which are permissible locations in the environment and several arcs which are permissible transitions between two nodes. The graph is used to estimate the target device's location based on the probabilistic model and the sequence of observations.

18 Claims, 4 Drawing Sheets

OTHER PUBLICATIONS

Piaggio et al, "Global localization via sub-graph isomorphism", 1999 Third European Workshop on Advanced Mobile Robots, 1999, pp. 151-158.

Duckett et al, "Knowing Your Place in Real World Environments", 1999 Third European Workshop on Advanced Mobil Robots, 1999 pp. 135-142.

* cited by examiner

POSITIONING TECHNIQUE

This is a Continuation application of International Application No. PCT/FI03/00553, filed Jul. 8, 2003, which relies on priority from Finnish Application No. 20021357, filed Jul. 10, 2002, the contents of both of which are hereby incorporated by reference in their entireties.

BACKGROUND OF THE INVENTION

The invention relates generally to a positioning technique in which a target device's location is estimated on the basis of a sequence of observations on the target device's wireless communication environment. FIG. 1 schematically illustrates an example of such a positioning technique. A target device T communicates via base stations BS via a radio interface RI. In this example, the communication is assumed to be radio communication. The target device T observes signal values at the radio interface RI. The observations O are applied to a probabilistic model PM that models the target device's wireless communication environment and produces a location estimate LE. As used herein, a target device is a device whose location is to be determined. The target device communicates via signals in a wireless environment, and signal values in the wireless environment are used for determining the target device's location. For example, the target device may be a data processing device communicating in a wireless local-area network (WLAN). The data processing device may be a general-purpose laptop or palmtop computer or a communication device, or it may be a dedicated test or measurement apparatus such as a hospital instrument connected to the WLAN. A location, as used herein, is a coordinate set of one to three coordinates. In some special cases, such as tunnels, a single coordinate may be sufficient but in most cases the location is expressed by a coordinate pair (x, y or angle/radius).

More particularly, the invention relates to a positioning technique that is based on a Hidden Markov Model. FIG. 2 schematically illustrates a Hidden Markov Model HMM. The model consists of locations, transitions between the locations and observations made at the locations. In the example shown in FIG. 2, the target device moves along a path of which five locations $q_{t-2}$ through $q_{t+2}$ are shown. More formally, $q_t$ defines the location distribution at time t, so that $P(q_t=s)$ is the probability for the target device being at location s at time t. However, because a location distribution can easily be converted to a single location estimate, the shorthand notation "location q" will be used to refer to a location distribution q.

The locations along the target device's path can be called path points. The target device communicates via signals in a wireless environment, and signal values in the wireless environment are used for determining the target device's location.

A practical example of the target device is a data processing device communicating in a wireless local-area network (WLAN) or a cellular radio network. The data processing device may be a general-purpose laptop or palmtop computer or a communication device, or it may be a dedicated test or measurement apparatus such as a hospital instrument connected to the WLAN. A signal value, as used herein, is a measurable and location-dependent quantity of a fixed transmitter's signal. For example, signal strength and bit error rate/ratio are examples or measurable and location-dependent quantities.

The word 'hidden' in the Hidden Markov Model stems from the fact that we are primarily interested in the locations $q_{t-2}$ through $q_{t+2}$ but the locations are not directly observable. Instead we can make a series of observations $o_{t-2}$ through $o_{t+2}$ on the basis of the signal values but there is no simple relationship between the observations $o_{t-2} \ldots o_{t+2}$ and locations $q_{t-2} \ldots q_{t+2}$. (Note that the straight arrows through the locations $q_{t-2}$ through $q_{t+2}$ are not meant to imply that the target devices moves along a straight path or with a constant speed, or that the observations are made at equal intervals.)

Note that a single 'observation' may comprise, and typically does comprise, several signal value measurements from one or more channels. In a probabilistic model, the idea is to measure the probability distribution of a signal value, and if there is any overlap in signal values in various locations, the locations cannot be determined on the basis of a single measurement per location. Instead, each observation must comprise a plurality of measurements in order to determine a probability distribution.

It should also be understood that in FIGS. 1 and 2, time is quantified. This means that a target device that has a single radio receiver may only observe one channel at any point of time, but the radio receiver can be re-tuned to a different channel in milliseconds, whereas the observations $o_{t-2} \ldots o_{t+2}$ are typically separated by at least a hundred milliseconds. The interval between observations can be selected based on the a typical target device's speed. Thus a single observation can comprise signal values from several channels even if a radio receiver has to be re-tuned between channels.

The radio receiver may measure signal values, such as signal strength, virtually continuously, but in a positioning application based on a Hidden Markov Model, it is beneficial to treat the observations in quantified time. Thus the term 'observation' can be summarized as a statistical sample of several signal values from a given period of time.

A problem underlying the invention derives from the Hidden Markov Model: we cannot observe a variable that has a monotonous relationship with distance or location. Instead the positioning method is based on observations of signal values. It is possible for two or more locations to have near-identical sets of signal values, and a location estimate may be grossly inaccurate.

BRIEF DESCRIPTION OF THE INVENTION

An object of the invention is to provide a method and an apparatus for implementing the method so as to alleviate the above disadvantages. In other words, it is an object of the invention to reduce the uncertainty of a positioning technique that is based on a probabilistic model of expected signal values. The object of the invention is achieved by the methods and equipment which are characterized by what is stated in the independent claims. The preferred embodiments of the invention are disclosed in the dependent claims.

The invention is based on the use of a graph (or a set of graphs) that models the topology of the positioning environment. A graph $G=\{V,A\}$ comprises n nodes or vertices $V=\{v_1, v_2, \ldots v_n\}$ and m arcs $A=\{a_1, a_2, \ldots a_m\}$ such that each arc $a_k=(v_i, v_j)$ describes a possible path or transition from $v_i$ to $v_j$. Thus all permissible routes in the positioning environment can be described by various combinations of the arcs of the graph G. For example, the graph G for a typical office would have an arc for each corridor, arcs connecting corridors to rooms (via doors), etc. It is a matter or semantics whether environments consisting of multiple floors are described by several interconnected graphs or one graph in which some of the arcs describe vertical transitions (lifts, stairs or escalators). In computer-aided design, an arc means a curve segment, but in graph theory, as well as in the context of the present invention, an arc means merely a connection between two nodes. In practice, an arc is drawn as a straight line.

It should be noted that the graph according to the invention is a property of the positioning environment in general, and is determined based on the obstacles in the positioning environment, in comparison to some prior art positioning techniques in which each target device's permissible locations are determined separately, based on the target device's own location history and attainable speed.

An advantage of the invention is that the target device's reported location moves naturally, that is, the target device does not appear to move through walls or other obstacles. Another advantage is that the graph serves as a good basis for establishing the probabilistic model on the basis of calibration measurements or calculations. If the graph nodes are also used as sample points of the probabilistic model, the positioning system is most accurate in areas where the target devices are likely to move.

If the target device's location is interpreted as a point or node of the graph, the target device's movements are easier to analyze by computers. In other words, the reported locations, being interpreted as points or nodes on a well-defined graph, are a much better source for data mining operations than are arbitrary locations, without any quantification. For example, a department store designer may want to search for patterns or correlations in customer movement. If the graph nodes are located at certain desks, it is rather easy to see if a client who stopped at desk x also passed by desk y. Without the graph, and the inherent quantification, the designer would have to look for coordinates within a certain area near each desk. Each graph node is a permissible location but a permissible location is not necessarily a graph node. The distance between nodes should be selected on the basis of the desired resolution. In other words, whoever drafts the graph, must answer the following question: how far off can a reported location be from the true location? The answer depends on the nature of a typical target device. If the target device is a communication device carried in person, an error of several meters may be acceptable because persons can easily be recognized from a distance of several meters. On the other hand, if the target devices comprise hospital instruments or the like, a smaller resolution is desirable. In most applications, the resolution (inter-node distance) is approximately one meter. A smaller distance gives a better resolution at the cost of increased consumption of resources. The consumed resources include calibration measurements, memory for storing the probabilistic model and computation power. Open spaces can be treated as a grid of horizontal and vertical arcs. Since visibility is good in open spaces, a coarser-than-normal resolution may be acceptable.

The graph G can be connected to the Hidden Markov Model as follows. Let d be a typical distance between points along an arc. The typical distance is the same as desired resolution, such as one meter. Let $S=\{s_1, s_2, \ldots s_k\}$ be the set of points along the arc such that the inter-point distance is d. S can be used as the value domain for the hidden state variables $q_i$ of the Hidden Markov Model.

The graph G is preferably used in connection with a set of transition probabilities between the graph nodes. Transition probabilities $P(q_t|q_{t-1})$ can be defined so that the probability for a transition from $s_i$ to $s_j$, i.e., $P(q_t=s_j|q_{t-1}=s_i)$, is non-zero only if a target device can make that transition in a period of time that fits between two observations.

Two alternative techniques for using the transition probabilities will be described. The first technique is based only on the speed of a typical target device, the period of time between observations and the distance between points. Let $d_{max}$ be the maximum distance travelled by a typical target device within a maximum period of time between observations. Any transition over $d_{max}$ in length has a probability of zero or very close to zero. For example, people rarely move faster than 2 m/s in typical indoor environments. Thus, if the time between two observations is 1 s, the probability of any transition over two meters in length is zero, or at least very low. (A non-zero probability means, for example, that people rarely run but running is not strictly prohibited.)

The second technique for transition probabilities is based on the concept of neighbours or closely-connected points. Two points, $s_i$ and $s_j$ are neighbours if one can be reached from the other via arcs of A without visiting any other point of S. The neighbour-based technique is elegant in the sense that the set of arcs in G is also the set of permissible transitions, which simplifies computation. A slight drawback is the fact that a fast-moving target device's position is reported with a delay. Assume that the target device moves quickly but linearly to a node three nodes away from its previous estimated location. Since only transitions to neighbours are permitted, the location estimate must proceed via all of the intervening nodes, which causes a delay of three observation periods.

According to a further preferred embodiment of the invention, the transition probabilities are first assigned a preliminary value on the basis of internode distances and typical target device speeds. When the positioning system is used, history of target device movement is assembled, and the transition probabilities are fine-tuned experimentally.

Uses for the transition probabilities are further discussed later, under the heading "Recursion-based techniques".

BRIEF DESCRIPTION OF THE DRAWINGS

In the following the invention will be described in greater detail by means of preferred embodiments with reference to the attached drawings, in which FIG. 1 schematically illustrates a positioning technique.

Figure 4:
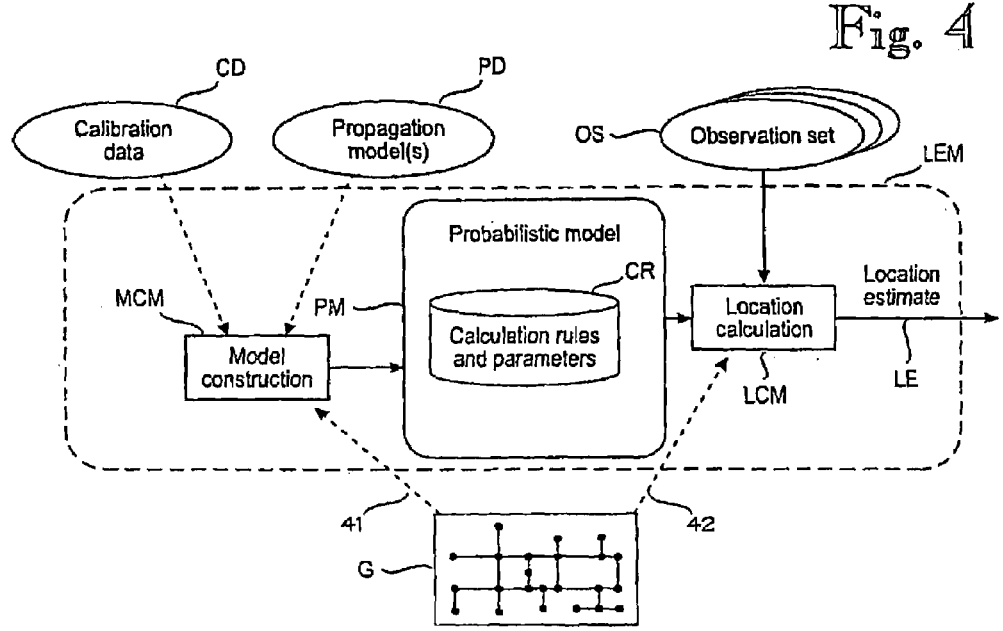
Figure 5A:
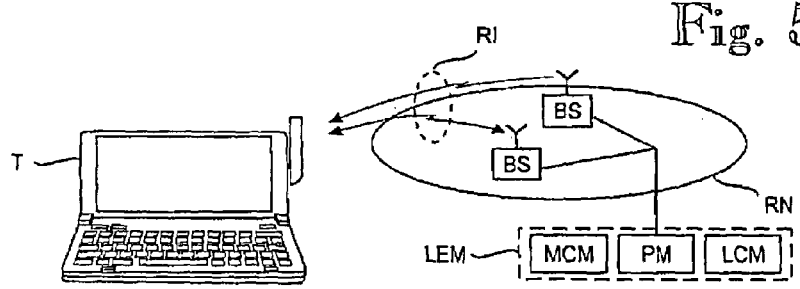
Figure 5B:
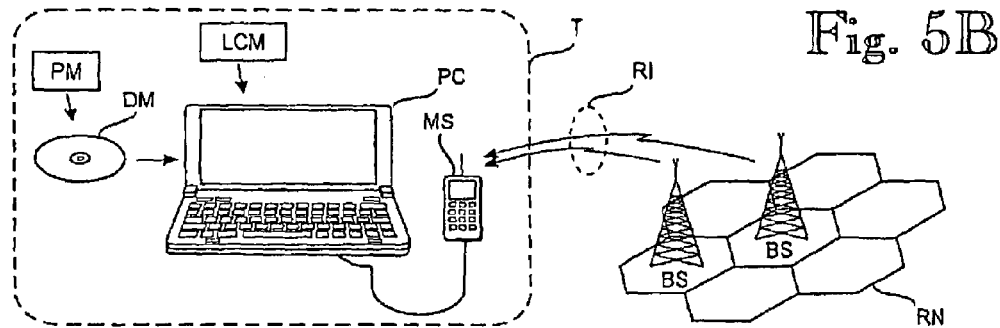
Figure 6:
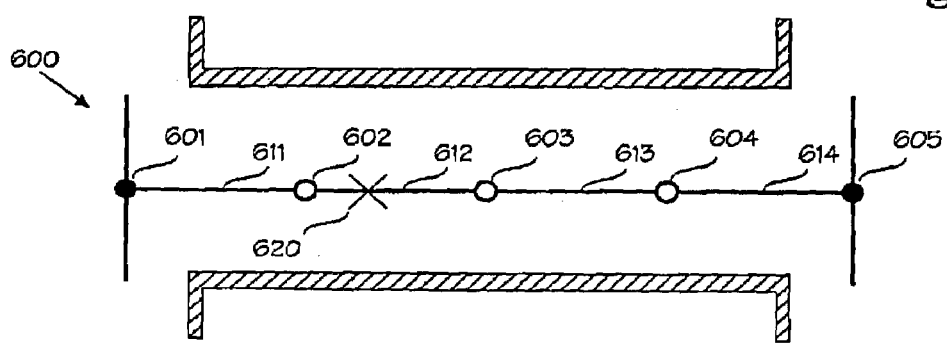
Figure 7:
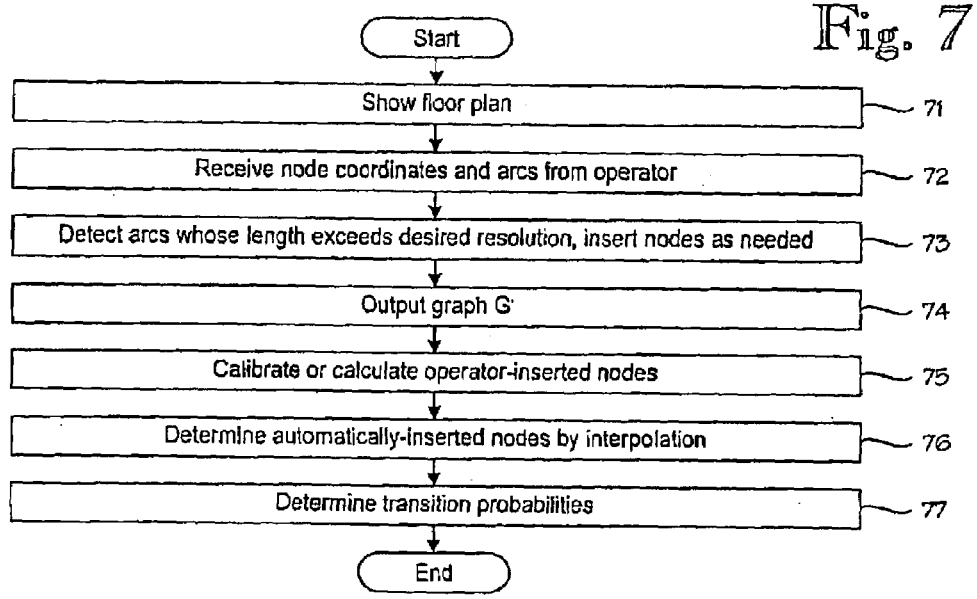
Figure 8:
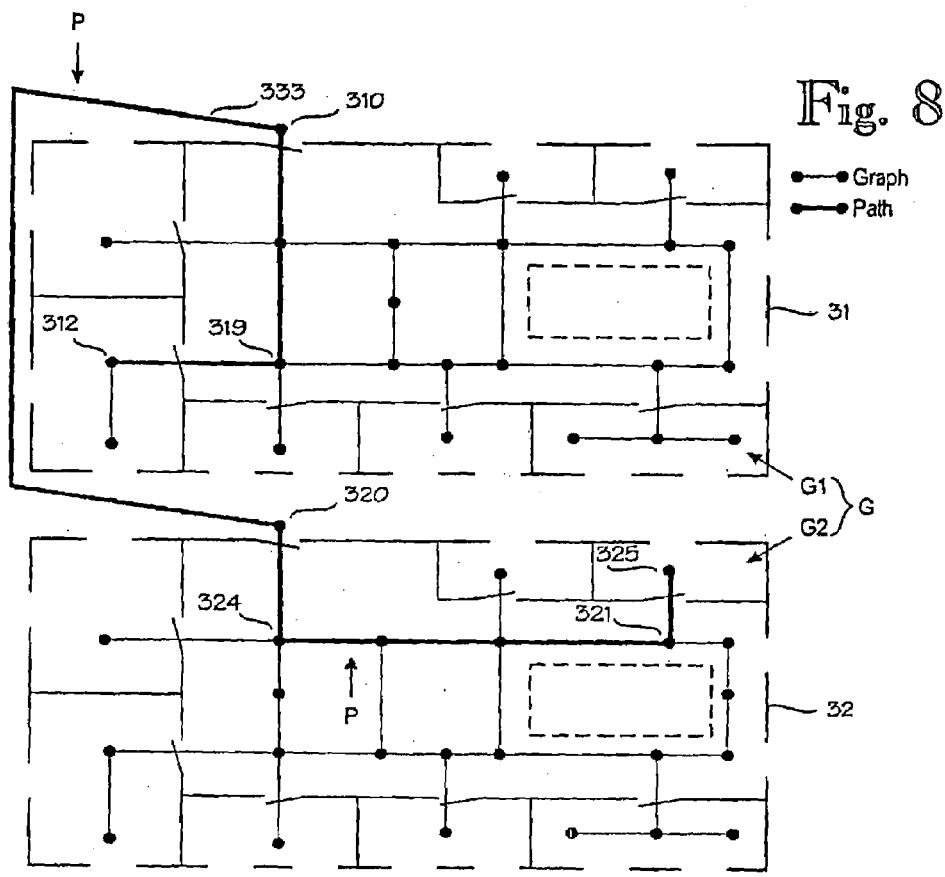

3 illustrates a graph according to the invention;

FIG. 4 shows a location estimation module LEM for estimating the target device's location based on signal values at the radio interface RI;

FIGS. 5A and 5B are block diagrams illustrating typical target devices whose location is to be determined;

FIG. 6 illustrates handling of long spans;

FIG. 7 shows a preferred technique for preparing a probabilistic model on the basis of a graph according to the invention;

FIG. 8 shows how the graph can be used as a road map; and

Figure 9:
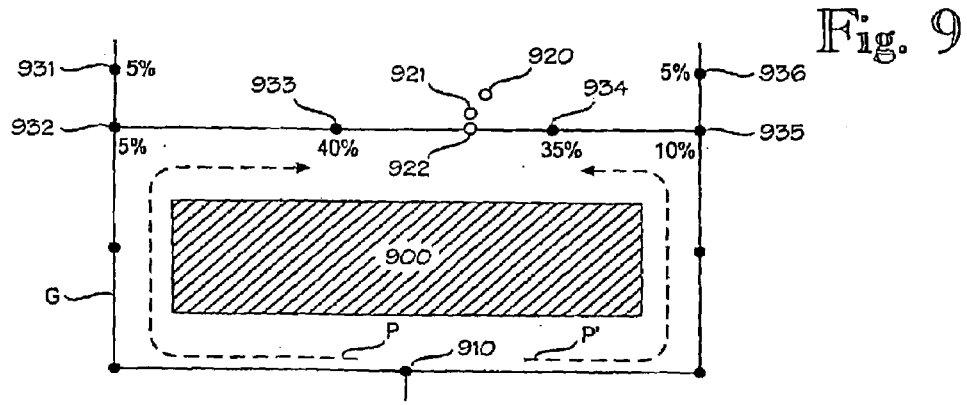

FIG. 9 shows further examples of location interpretation and optimal path selection.

DETAILED DESCRIPTION OF THE INVENTION

Figure 1:
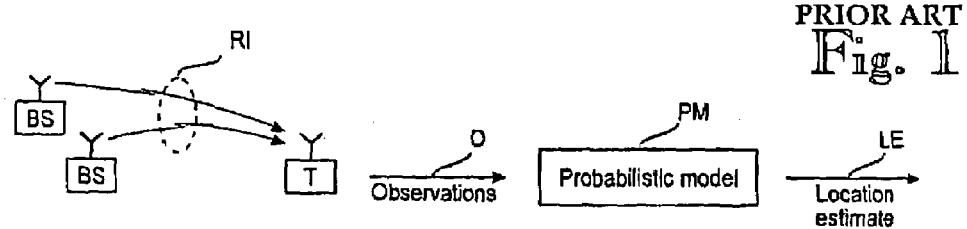
Figure 2:
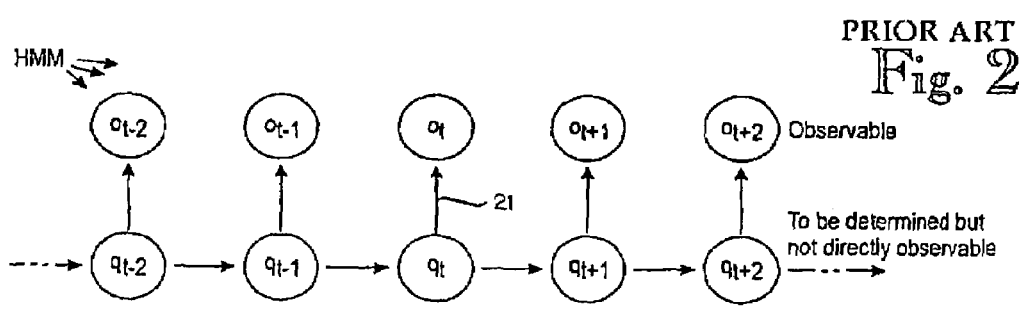
FIG. 2 illustrates a Hidden Markov Model.
Figure 3:
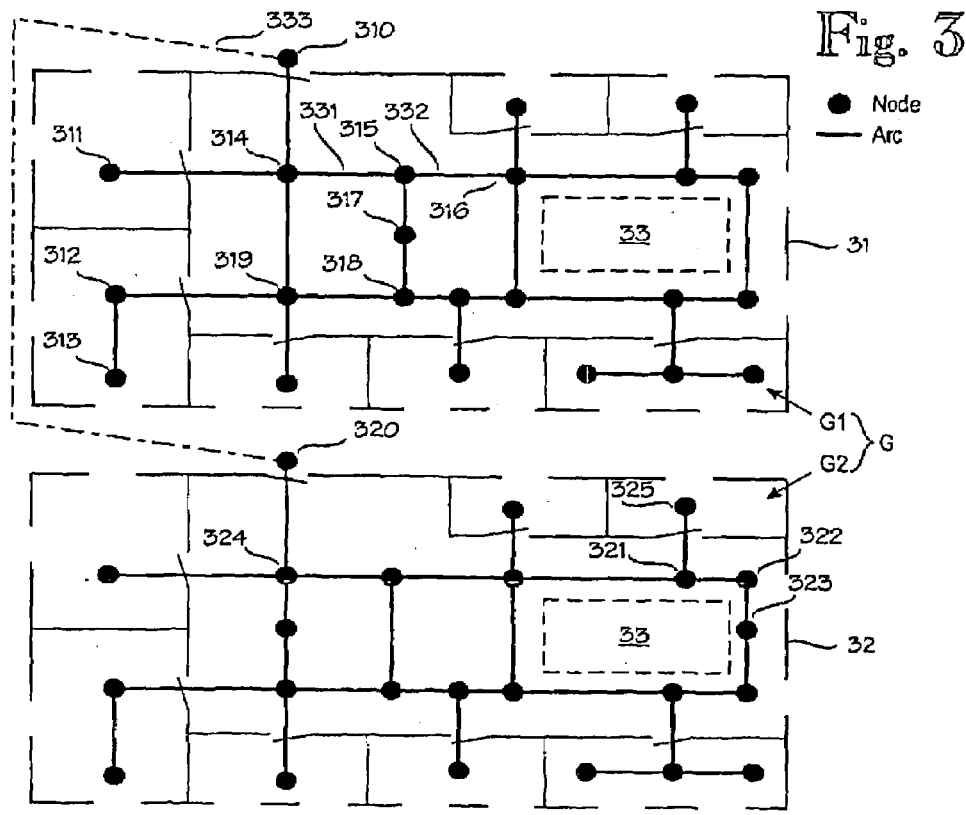

FIG. 3 illustrates a graph G according to the invention. In this example the graph G comprises two subgraphs G1 and G2 such that subgraph G1 corresponds to the floor plan 31 of the first floor and subgraph G2 corresponds to the floor plan 32 of the second floor. The graph comprises nodes, drawn as black circles, such that each node indicates a permissible location for a target device. The distance between nodes should be selected on the basis of the desired resolution. In most applications, the resolution (inter-node distance) is approximately one meter. A smaller distance gives a better resolution at the cost of increased consumption of resources. The consumed resources include calibration measurements, memory for storing the probabilistic model and computation power. For most office rooms, a single node is sufficient, such as the node 311 in the upper left-hand room. On the other hand, larger rooms may have more nodes such as the nodes 312 and 313 in the lower left-hand room. Nodes 314 to 319 are nodes placed in an open space. Such nodes should be placed such that the desired resolution is achieved, without consuming too much computational resources. The floor plan comprises an impermissible area 33 that is drawn with a dashed line. For example, the impermissible area may be a receptionist's desk, office equipment, building structure, or any obstacle into which a target device cannot move. Or, to express it more precisely, the target device may move into the area 33 but its location is interpreted as being outside the area 33.

In addition to the nodes 310, 311, etc., that indicate permissible locations, the graph G comprises arcs that indicate permissible transitions between the nodes. To keep the graph simple in FIG. 3, arcs are only allowed if they are horizontal or vertical and connect exactly two nodes, without passing through additional nodes. For instance, arc 331 connects nodes 314 and 315, and arc 332 connects nodes 315 and 316 but there is no arc from node 314 to node 316.

Although the office space shown in FIG. 3 is three-dimensional, it is treated as several interconnected two-dimensional spaces. Nodes 310 and 320 are the entry points to the first and second floor, respectively. Arc 333 connects the entry points, 310, 320, to the two floors.

FIG. 4 is a block diagram of an exemplary location estimation module LEM for estimating the target device's location based on signal values at the radio interface RI. FIG. 4 shows a compact location estimation module LEM, but more distributed embodiments are equally possible. An essential feature of the location estimation module is a probabilistic model PM of the target device's wireless environment, the probabilistic model being able to predict the target device's location given a plurality of observations from the radio interface. In this example, the probabilistic model PM is built and maintained by a model construction module MCM. The model construction module MCM builds and maintains the probabilistic model on the basis of calibration data CD or propagation data PD in the form of one or more propagation models, or any combination thereof. Calibration data CD is the result of physically measuring signal values at known locations (or determining the coordinates of those locations if they are not known by other means). Optionally, the calibration data records may also comprise the time at which the measurement was made, in case the signal parameters vary with time. Instead of the calibration data CD, or in addition to them, one or more propagation models PD can be used to model the radio interface RI. The propagation models can be constructed by techniques that are analogous to ray-tracing techniques for visual simulation. The locations at which calibration measurements are collected are called calibration points. The calibration data CD comprises data records each of which comprises the location of the calibration point in question and the set of signal parameters measured at that calibration point. The location can be expressed in any absolute or relative coordinate system. In special cases, such as trains, highways, tunnels, waterways or the like, a single coordinate may be sufficient, but normally two or three co-ordinates will be used.

There is also a location calculation module LCM for producing a location estimate LE on the basis of the target device's observation set OS and the probabilistic model PM. For instance, the location calculation module can be implemented as a software program being executed in a laptop or palmtop computer. Technically, the 'measurements' and 'observations' can be performed similarly, but to avoid confusion, the term 'measurement' is generally used for the calibration measurements, and the signal parameters obtained at the current location of the target device are called 'observations'. The target device's most recent set of observations is called current observations.

The graph G has several major applications within a positioning system. For example, the graph can be used during construction of the probabilistic model. Sample points of the probabilistic model are preferably placed at the nodes of the graph. For instance, the model construction module MCM preferably comprises an automatic check that a sample point has been actually determined (calibrated, simulated or interpolated) for each graph node.

The graph is also a good foundation for determining transition probabilities between possible locations.

Finally, the graph can be used to estimate or interpret the target device's location. For example, the target device's location can be interpreted as a point on the arc closest to the estimated location. Thus the location is forced on one of the arcs of the graph. The location can be further quantified by interpreting it as the graph node closest to the estimated location. A final location interpretation can be made by combining several intermediate estimates.

Some or all of the applications of the graph are preferably used simultaneously, such that the sample points of the probabilistic model are placed at the graph nodes and the target device's location is estimated or interpreted based on the graph. Because the permissible locations are at or close to the graph nodes, the positioning application is most accurate near the graph nodes. Conversely, the positioning application may be relatively inaccurate at impermissible locations, such as the area 33, but if this area cannot be entered at all, or at least locations inside the area are not reported as the target device's location, any inaccuracy in such areas is immaterial. Dashed lines 41 and 42 illustrate, respectively, uses of the graph G for model construction and location estimation/interpretation. Naturally, it is not the visual presentation of the graph that is important but its internal structure.

FIG. 5A is a block diagram illustrating a typical target device T whose location is to be determined. In this example, the target device T is shown as a portable computer that communicates via a radio network RN. For example, the radio network can be WLAN (wireless local-area network) network. In the embodiment shown in FIG. 5A, the location estimation module LEM comprising the probabilistic model PM is not installed in the target device T. As a result, the target device T must send its observation set OS to the location estimation module LEM via one or more of the base station BS it is connected to. The location estimation module LEM returns the target device its location estimate LE via the radio interface RI.

FIG. 5B shows an alternative embodiment in which the target device's attached computer PC receives a copy of the probabilistic model PM on a detachable memory DM, such as a CD-ROM disk, and the target device T is able to determine its own location without transmitting anything. As a yet further alternative (not shown separately), the attached computer PC may receive the probabilistic model via an Internet (or any other data) connection to the location estimation module LEM. Wideband mobile stations can receive the probabilistic model via the radio interface RI. A hybrid of the technologies may also be used such that the receiver receives an initial probabilistic model via a wired connection or on the detachable memory, but later updates to the model are sent via the radio interface.

FIG. 6 illustrates handling of long spans. In this context, "long" means longer than the desired resolution of the positioning system. If it is desirable to have a round-off error less than one meter, then any span over two meters is "long". Such long spans are common in corridors and in large open spaces. In this example, a graph 600 has two naturally-occurring nodes, 601, 605, at the ends of the corridor, but interpreting the target device's location as one of the end nodes introduces too much quantization error. Accordingly, the graph 600 is preferably drawn with a computer-aided program such that the operator only has to enter the nodes 601 and 605 at which bends or junctions occur naturally, and the program automatically recognizes spans that exceed the desired resolution and inserts additional nodes as needed. For example, if the span from 601 to 605 is nine meters and a round-off error of one meter is tolerated, then the span 601 to 605 is split into four arcs 611 to 614 with three additional nodes 602, 603 and 604.

Alternatively, if the distance between nodes is larger than the desired resolution, we can interpolate between the nodes. For example, if the target device's observations correspond to nodes 602 and 603, but node 602 is a better match, the target device's location could be interpolated to point 620 between nodes 602 and 603. However, in many applications it is preferable to place nodes densely enough so that no interpolation is needed and the target device's location is interpreted as the node closest to the estimated location. For instance, data mining applications are simplified by quantifying the estimated locations to graph nodes instead of points between nodes.

The graph nodes 601 to 605 are preferably also the sample points of the probabilistic model PM. There are or may be several kinds of sample points. One type of sample point, called a calibration point, is based on actual calibration measurements made in the actual positioning environment. (See the calibration data CD in FIG. 4.) Another type of sample point is calculated on the basis of one or more propagation models PM. A third type of sample point is based on interpolation between calibration points or calculated points. For instance, assume that the nodes 601 and 605 are calibration points. Then the nodes 602, 603 and 604 can be derived from the calibration points by interpolation. The interpolation should not be based on summing (averaging) the probability distributions at the nodes 601 and 605, for the following reason. Assume that signal strength is used for positioning and that the signal strength at node 601 has a probability peak at 20 units. At node 605 the probability peak is at 40 units. If the probability distributions are averaged, the combined probability distribution still has peaks at 20 and 40 units, although it seems natural that the combined probability should have one peak at about 30 units. Thus a preferred form of interpolation is based on a combination of cumulative distribution functions of the signal values at the nodes that the interpolation is based on. If the interpolation does not take place at the middle point, then the known nodes are inversely distance-weighted. For example, assume that node 602 is to be interpolated on the basis of known calibration points 601 and 605. Node 605 is three times more distant than node 601. Accordingly, the cumulative distribution function of node 601 is weighted three time stronger than that of node 605.

FIG. 7 shows a preferred technique for preparing a probabilistic model on the basis of a graph according to the invention. In step 71, a program similar to a computer-aided design (CAD) program displays the floor plan of the positioning environment. In step 72, the operator enters node coordinates and arcs. In step 73, the CAD-like program detects arcs whose length exceeds the desired resolution and splits them by inserting nodes such that the resulting arcs are shorter than the desired resolution, as described in connection with FIG. 6. The program may automatically insert the minimum amount of extra nodes or prompt the operator for a suitable number of nodes to be inserted. In step 74 the graph G is displayed and, most likely, printed on paper to serve as a map for calibration personnel. In step 75, the calibration nodes are calibrated and/or the nodes based on the propagation model(s) are calculated. The operator-entered nodes are preferably determined by actual calibration or calculation. In an optional step 76, the computer-inserted nodes are determined by interpolation on the basis of calibrated or calculated nodes. In a further optional step 77, the inter-node transition probabilities are determined on the basis of a typical target device's speed and observation frequency, as described earlier.

FIG. 8 shows how the graph can be used as a road map. Such a road map can be used to guide a target device to a desired location via an optimal path P. The path can be optimized, for example, by minimizing some cost parameter of the path, such as length, time or energy. As is well known, some path optimization problems are very complex and cannot be solved in a reasonable time. The invention does not relate to path optimization per se. Rather, some aspects of the invention relate to constructing the optimal path from the arcs of the graph G according to the invention. Thus the term 'optimal' does not necessarily mean that the path is indeed optimal but that it is the result of some optimization process (that may or may not be perfect).

The optimal path P may by indicated to a person or a robot. The floor plan and graph shown in FIG. 3 will be used again. For the purpose of a concrete example, assume that the environment is a hospital, the target device is carried by a doctor who is at node (room) 312 and the doctor is urgently needed at node 325. FIG. 8 shows the full graph G, consisting of subgraphs G1 and G2 for each of the two floors, in order to show how the optimal path P is constructed from arcs of the graph. However, the full graph G is preferably not shown to the doctor. Instead, only the optimal path P, via nodes 312-319-310-320-324-321-325, is shown. Because a typical target device, such as a palmtop computer, has a small display, the optimal path P and the underlying floor plan are preferably shown in parts, in response to the target device's detected location. At first, the path portion 312-319-310 on the first floor may be shown, with the underlying portions of the floor plan 31. When the target device approaches the stairs or lift 333, that portion is shown, and when it approaches the entry node 320 to the second floor 32, the remaining part 320-324-321-325, is shown. Thus not only do the graph nodes serve as quantified locations but also selected arcs of the graph can be combined to an optimal path from the target device's detected location to its desired location.

FIG. 9 shows further examples of location interpretation and optimal path selection. Assume that a guard is at node 910 and an alarm is given somewhere beyond a large obstacle 900. The target device sending the alarm is actually located at point 920 but, naturally, the positioning system does not know the exact location. Assume that the probabilistic positioning system determines that node (sample point) 933 is node having the highest probability (40%) of being the node closest to the target device. In this example, the positioning system determines that nodes 931, 932, 933, 934, 935 and 936 have respective probabilities of 5, 5, 40, 35, 10 and 5 per cent. In this example, if the target device's location estimate may be the probability distribution of the six nodes 931 to 936 (or some other subset of nodes whose probability exceeds a given threshold). But for most practical purposes, the probability distribution must be interpreted as a single location. For example, the target device's location can be interpreted as a probability-weighted combination of the nodes 931 to 936. This probability-weighted combination is shown as location 921. It is frequently beneficial to interpret the target device's location as a point or node of the graph G closest to the estimated location 921. The point of the graph G closest to the location 921 is point 922.

Sometimes it is desired to interpret or quantify the target device's location as one of the graph nodes (instead of an arbitrary point of the graph). Such quantification simplifies data mining or decision making, for example. On the basis of the probabilistic model, node 933 has the highest probability of being the closest node. If the target device's location is interpreted as node 933, the optimal path P from node 910 is via node 932. On the other hand, node 934 is the node closest to the probability-weighted combination 921 of nodes. If node 934 is selected as the target device's interpreted location, the optimal path P' from node 910 is via node 935. Accordingly, a preferred implementation of the optimal path is a path that minimizes the expected value of some cost parameter, such as length or time, of the path.

In the discussion so far, only the target device's most recent observation has been used to estimate its location. In the following, more advanced sequence-based techniques for location estimation will be described.

Recursion-based Techniques

Given a time-ordered sequence of observations $o_1^T = \{o_1 \ldots, o_T\}$ we want to determine the location distribution $q_t$ at time t, 1 <<. Assume that an observation $o_i$ only depends on the current location $q_i$ and that $q_i$ only depends on the previous location $q_{i-1}$. The latter assumption means that history is not studied further than one prior observation. If these assumptions are met, we can represent the positioning problem as a hidden Markov model (HMM) of order 1 where $o_1^T$ is a sequence of observations and $q_1^T$ is a sequence of locations. In this case, the joint probability of $o_1^T$ and $q_1^T$ is:

$$P(o_1^T, q_1^T) = P(q_1) \Pi_{t=1 \ldots T-1} P(q_{t+1}|q_t) \Pi_{t=1 \ldots T} P(o_t|q_t) \quad [1]$$

The joint distribution is therefore completely specified in terms of 1. the initial state probabilities $P(q_1)$,
2. the transition probabilities $P(q_t|q_{t-1})$ and,
3. the observation probabilities $P(o_t|q_t)$.

If all locations are considered equally probable by default, we can simplify equation 1 by setting the initial state probability $P(q_1)$ same for all locations. Thus, the joint distribution depends only on the transition probabilities and observation probabilities. These probabilities can be defined in various ways. For example, transition probabilities can be based on the spatial distance between locations so that the transition probability approaches zero when the distance increases. Because the recursion-based techniques can be applied regardless on how transition and observation probabilities are determined, we assume from now on that the transition probabilities and the observation probabilities are given.

The location distribution at time t can be defined as:

$$P(q_t|o_1^T) = P(o_1^t, q_t) P(o_{t+1}^T|q_t)/P(o_1^T) \quad [2]$$

where $P(o_1^t, q_t)$ and $P(o_{t+1}^T|q_t)$ are obtained from equations 3 and 4 (forward and backward recursions) and $P(o_1^T)$ is the probability of the observations, used for normalizing. Let S be the set of possible locations in this model and n=|S| be the size of S. The time complexity of the forward and backward recursions is $O(T_m)$ where T is the length of the history and m is the number of non-zero transition probabilities at each time step. Obviously, m<$^2$ because in the worst case all transitions have non-zero probability. Most transitions have a probability of zero, however, so in practice m<<$n^2$ which makes computation very fast.

$$P(o_1^t, q_t) = P(o_t|q_t) \Sigma_{q_{t-1}} P(q_t|q_{t-1}) P(o_1^{t-1}, q_{t-1}) \quad [3]$$

$$P(o_{t+1}^T|q_t) = \Sigma_{q_{t+1}} P(o_{t+1}|q_{t+1}) P(q_{t+1}|q_t) P(o_{t+2}^T|q_{t+1}) \quad [4]$$

In this way we can obtain the probabilities of different locations at a given time. However, many applications require a location estimate that is a single location instead of the location distribution. Again, there are several ways to calculate the point estimate at time t. For example, the point estimate can be a weighted average of locations where the location probability is used as the weight, or the location having the highest probability.

In order to find the most likely route, the Viterbi algorithm can be used. The Viterbi algorithm can find a sequence of locations $S_1, \ldots, S_T$ that it maximizes the probability $P(o_1^T|q_1=s_1, \ldots, q_T=s_T)$. Obviously, a location $s_t$ can be used as the location estimate at time t. However, this method has the drawback that at each time step, the location estimate can only be one of the possible locations. Thus, the accuracy of the location estimate depends on the density of possible locations. Accuracy could be improved by using a large S having possible locations very close to each other. Unfortunately, this would radically increase time requirements of the algorithm.

In order to gain accurate location estimates with a reasonable amount of computation, we can use relatively small S and calculate a location estimate for time t as a weighted average of possible locations $\Sigma(w_i \cdot s_i)/\Sigma w_i$. The weight $w_i$ for a location $s_i$ can be defined as the probability of the most likely path that goes through location $s_i$ at time t. Path probabilities are obtained by using the Viterbi algorithm normally for time steps 1–t (creating forward paths) and backwards from time step T to t (creating backward paths) and multiplying the probabilities of forward and backward paths ending to $s_i$ for each i=1 . . . n.

It is apparent to a person skilled in the art that, as the technology advances, the inventive concept can be implemented in various ways. The invention and its embodiments are not limited to the examples described above but may vary within the scope of the claims.

The invention claimed is:

1. A method for estimating a target device's location in a wireless communication environment, the method comprising:

maintaining a probabilistic model for a plurality of sample points, each sample point comprising a sample location and an expected distribution of signal values at that sample point;

making a sequence of observations of signal values wherein each observation corresponds to a respective location along the target device's path, wherein the sequence of observations and the respective locations constitute a Hidden Markov Model;

forming a graph that models the topology of the wireless communication environment, wherein the graph indicates:
- a set of nodes, each node indicating a permissible location in the wireless communication environment;
- a set of arcs, each arc indicating a permissible target device transition between two nodes; and using the graph to estimate the target device's location based on the probabilistic model and the sequence of observations.

2. A method according to claim 1, wherein the step of using the graph comprises estimating the target device's location and interpreting the estimated location as a point of the arc closest to the estimated location.

3. A method according to claim 2, further comprising interpreting the target device's estimated location as the node closest to the estimated location.

4. A method according to claim 1, wherein the step of using the graph comprises estimating the target device's location as a subset of graph points or nodes, associating a probability to each point or node in the subset and interpreting the estimated location as probability-weighted combination of the subset of points or nodes.

5. A method according to claim 1, wherein each arc indicates a permissible target device transition between two nodes in a period of time that fits between two observations.

6. A method according to claim 1, further comprising using the nodes as the sample points of the probabilistic model.

7. A method according to claim 1, wherein the step of forming the graph comprises the following acts performed by a programmed computer:
- receiving coordinates of operator-indicated nodes and arcs from an operator; and
- detecting arcs whose length exceeds a predetermined maximum distance that is based on a typical target device speed and a typical period of time between observations, and dividing such arcs with additional nodes.

8. A method according to claim 7, further comprising placing the sample points of the probabilistic model at the nodes of the graph, and:
- determining at least some of the sample points at operator-indicated nodes based on calibration and/or a propagation model; and
- determining at least some sample points at the additional nodes by interpolation from the operator-indicated nodes.

9. A method according to claim 1, further comprising determining transition probabilities between the nodes.

10. A method according to claim 9, wherein the transition probabilities are based on a typical target device speed and a typical period of time between observations.

11. A method according to claim 1, further comprising forming an optimal path of nodes from the target device's detected node to its desired node.

12. A method according to claim 10, further comprising displaying the optimal path superimposed with an underlying map or floor plan.

13. A method according to claim 11, further comprising displaying the optimal path in parts in response to the target device's detected location.

14. A method according to claim 1, further comprising estimating the target device's location based on one or more recursions of the sequence of observations.

15. A method according to claim 14, wherein the one or more recursions comprise a forward recursion and a backward recursion.

16. A location estimation module for estimating a target device's location in a wireless communication environment, the location estimation module comprising:
- a probabilistic model for a plurality of sample points, each sample point comprising a sample location and an expected distribution of signal values at that sample point;
- means for making a sequence of observations of signal values wherein each observation corresponds to a respective location along the target device's path, wherein the sequence of observations and the respective location constitute a Hidden Markov Model;
- a graph for modeling the topology of the wireless communication environment, wherein the graph indicates:
  - several nodes, each node indicating a permissible location in the wireless communication environment;
  - several arcs, each arc indicating a permissible target device transition between two nodes;
- means for estimating the target device's location based on the probabilistic model and the sequence of observations and the graph.

17. A location estimation module according to claim 16, wherein the location estimation module is contained in the target device.

18. A location estimation module according to claim 16, wherein the location estimation module is contained in a fixed part of the wireless communication environment.

* * * * *